(12) United States Patent
Childs et al.

(10) Patent No.: US 12,510,893 B2
(45) Date of Patent: Dec. 30, 2025

(54) VISUAL GUIDANCE SYSTEM WITH MACHINE LEARNING FOR AGRICULTURAL MACHINES

(71) Applicant: CNH Industrial America LLC, New Holland, PA (US)

(72) Inventors: Albert Childs, Meadville, PA (US); Chandrashekhar Singh, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 563 days.

(21) Appl. No.: 17/746,526

(22) Filed: May 17, 2022

(65) Prior Publication Data

US 2023/0376041 A1   Nov. 23, 2023

(51) Int. Cl.
*G05D 1/00* (2024.01)
*A01B 69/04* (2006.01)
*A01F 15/08* (2006.01)

(52) U.S. Cl.
CPC ......... *G05D 1/0221* (2013.01); *A01B 69/008* (2013.01); *A01F 15/0825* (2013.01); *G05D 1/0223* (2013.01)

(58) Field of Classification Search
None
See application file for complete search history.

(56) References Cited

U.S. PATENT DOCUMENTS

| | | | |
|---|---|---|---|
| 5,226,356 A | 7/1993 | Schrag et al. | |
| 7,640,721 B2 | 1/2010 | Viaud et al. | |
| 8,924,091 B2 | 12/2014 | Seeger | |
| 9,078,398 B2 | 7/2015 | Lang | |
| 9,706,697 B2 | 7/2017 | Wilkening et al. | |
| 2012/0072068 A1* | 3/2012 | Madsen | A01F 15/0833 701/28 |
| 2012/0240546 A1 | 9/2012 | Kormann | |
| 2020/0404854 A1* | 12/2020 | Kraus | A01F 15/106 |
| 2021/0191408 A1* | 6/2021 | Hayashida | A01B 69/008 |

FOREIGN PATENT DOCUMENTS

| | | |
|---|---|---|
| EP | 1685759 A1 | 8/2006 |
| EP | 2267567 A2 | 12/2010 |
| EP | 2368419 A1 | 9/2011 |
| EP | 2870857 A1 | 5/2015 |
| EP | 3162189 A2 | 5/2017 |
| WO | 2018/206678 A1 | 11/2018 |
| WO | WO-2021001456 A1 * | 1/2021 ......... A01F 15/0833 |

OTHER PUBLICATIONS

Extended European Search Report and Written Opinion for EP Application No. 23174102.6 dated Mar. 18, 2024 (13 pages).

* cited by examiner

*Primary Examiner* — Madison R. Inserra
(74) *Attorney, Agent, or Firm* — CM Law; Stephen J. Weed

(57) ABSTRACT

An agricultural machine system includes: a first mechanism; and an agricultural machine including a machine frame; a control system operatively coupled with the first mechanism and the agricultural machine frame, the control system including: a controller system operatively coupled with the first mechanism and the agricultural machine and configured for: learning from a prior harvesting episode; determining a first mechanism adjustment signal based at least in part on the prior harvesting episode; and outputting the first mechanism adjustment signal so as to adjust the first mechanism.

15 Claims, 5 Drawing Sheets

VISUAL GUIDANCE SYSTEM WITH MACHINE LEARNING FOR AGRICULTURAL MACHINES

FIELD OF THE INVENTION

The present invention pertains to an agricultural machine, and, more specifically, to an agricultural machine employing a control system.

BACKGROUND OF THE INVENTION

Agricultural harvesting machines, such as agricultural balers (which can be referred to balers), have been used to consolidate and package crop material (which, depending upon the application, can also be referred to as hay, forage, forage material, or forage crop material) so as to facilitate the storage and handling of the crop material for later use. Often, a mower-conditioner cuts and conditions the crop material for swath or windrow drying in the sun. When the cut crop material is properly dried (depending upon the application), an agricultural harvesting machine, such as an agricultural baler, which can be a round baler, travels along the swaths or windrows (hereinafter, collectively referred to as windrows, unless otherwise specified) to pick up the crop material. In the case of round balers, the crop material is formed into cylindrically-shaped round bales. More specifically, pickups of the baler gather the cut and windrowed crop material from the ground, and then convey the cut crop material into a bale-forming chamber within the baler. A drive mechanism operates to activate any pickups, augers, and/or a rotor of a feed mechanism. A conventional baling chamber may include a pair of opposing sidewalls with a series of rolls (which can be referred to as rollers) and belts that rotate and compress the crop material into a cylindrical shape. When the bale has reached a desired size and density, a wrapping assembly, which includes wrap material, may wrap the bale to ensure, at least in part, that the bale maintains its shape and density. The wrap material can include a film (such as a flexible plastic wrap) or a net (which can be referred to as net wrap). For example, wrap material may be used to wrap the bale of crop material. A cutting or severing mechanism of the wrapping assembly may be used to cut the wrap material once the bale has been wrapped. The wrapped bale may be ejected from the baler and onto the ground by, for example, raising a tailgate of the baler. The tailgate is then closed, and the cycle repeated as necessary and desired to manage the field of cut crop material.

The operation of agricultural harvesting machines, such as a tractor pulling an implement such as a baler, typically relies heavily on an operator's ability to visually observe field conditions, field features, and machine functions and to react to them accordingly for the most efficient machine operation. The navigational control of the agricultural machine is one aspect that absorbs a significant amount of an operator's attention and steals away focus on the machine operation, the navigational control requiring operator constantly to be looking forward (towards the windrow) and back (towards the baler) in order to navigate the tractor and to monitor and control the baler; the operator may need to turn greater than 180 degrees in order to monitor everything to the front of tractor and everything to the rear. Global Positioning System (GPS) has been an effective solution for automatic guidance of agricultural machines. Systems using GPS can automatically guide the agricultural work vehicle, such as a tractor, by controlling the steering to follow predetermined paths. GPS-based automatic guidance systems work very well for primary field operations such as tillage, planting, spraying, and cutting, but they do not work as well for secondary or tertiary operations such as raking, baling, or chopping. This is because the crop may have been moved away from the original GPS guidance lines, and for windrows that are going to be baled, such windrows often can be blown out of line by the wind. Thus, operators are used to adjust steering when windrows do not follow a straight line or prior GPS coordinates. Additionally, for baling operations, it is advantageous to drive in a weaving pattern so that the windrow of crop material may be evenly distributed into the bale chamber of the baler and thereby form an evenly shaped bale.

For instance, a known baler system includes a tractor pulling a round baler. The baler includes a left side bale shape sensor, a right side bale shape sensor, and a bale size sensor, each of which sends its signal to a baler controller. The baler controller sends this information to the tractor controller, which can output to a user interface whether the bale in the bale chamber of the baler is properly forming in terms of its shape and size. For instance, if the forming bale has a larger diameter on the left side compared to the right side, then to obtain a balanced bale the operator, using this information from the user interface, can steer the tractor and thus also the baler rightward so as to cause more crop material from the windrow to fill the right side of the bale chamber compared to the left side of the bale chamber.

In the field of automotive vehicles, visual sensors and image processing technology are used to assist with lane-keeping and ultimately to guide vehicles on roadways using painted road lines. That is, visual data from such sensors are used to indicate to the vehicle operator or to direct the vehicle itself to be centered between two lines that define a lane.

What is needed in the art is a way to improve operation of agricultural machine systems that harvest crop material by automating navigational control of the agricultural machine system.

SUMMARY OF THE INVENTION

The present invention provides an agricultural machine system, such as a tractor pulling a baler, including a control system configured for learning from one or more prior harvesting, such as baling, episodes, for example, and thereby improving the efficiency of a current baling episode.

The invention in one form is directed to an agricultural machine system, including: a first mechanism; and an agricultural machine including a machine frame; a control system operatively coupled with the first mechanism and the agricultural machine frame, the control system including: a controller system operatively coupled with the first mechanism and the agricultural machine and configured for: learning from a prior harvesting episode; determining a first mechanism adjustment signal based at least in part on the prior harvesting episode; and outputting the first mechanism adjustment signal so as to adjust the first mechanism.

The invention in another form is directed to a control system of an agricultural machine system, the agricultural machine system including a first mechanism and an agricultural machine including a machine frame and a chamber one of coupled with and formed by the machine frame, the control system operatively coupled with the first mechanism and the agricultural machine frame, the control system including: a controller system configured for being operatively coupled with the first mechanism and the agricultural machine and further configured for: learning from a prior harvesting episode; determining a first mechanism adjustment signal based at least in part on the prior harvesting episode; and outputting the first mechanism adjustment signal so as to adjust the first mechanism in order to fill the chamber evenly with a crop material.

The invention in yet another form is directed to a method of using an agricultural machine system, the method including the steps of: providing a first mechanism, an agricultural machine, and a control system, the agricultural machine including a machine frame and a chamber one of coupled with and formed by the machine frame, the control system operatively coupled with the first mechanism and the agricultural machine frame, the control system including a controller system operatively coupled with the first mechanism and the agricultural machine; learning, by the controller system, from a prior harvesting episode; determining, by the controller system, a first mechanism adjustment signal based at least in part on the prior harvesting episode; and outputting, by the controller system, the first mechanism adjustment signal so as to adjust the first mechanism.

An advantage of the present invention is that it provides for using visual image processing to monitor windrow position and to assist and to control navigation of an agricultural machine, for pairing visual image processing and implement sensing together to direct machine navigation, and for using a navigational system that can operate independent of GPS data from prior harvesting operations.

Another advantage of the present invention is that it provides, in field environments in which agricultural machines operate and which are visually complex, for using visual data of the crop material and ground location in concert with sensor input from the agricultural implement (such as a baler) in order to determine where to direct the work vehicle (such as a tractor), so that agricultural work may be performed optimally.

Yet another advantage of the present invention is that it provides more efficient baler operations and can be applied to many different agricultural applications where guidance of an agricultural vehicle is based on visual distinctions in the operating environment, that is, using image processing of visual data to guide an agricultural machine performing work in a field. Other such agricultural applications include, but are not limited to, using the following agricultural systems or machines: mowers, cutters, tedders, rakes, mergers, choppers, tillers, self-loading forage wagons, and harvesters. The present invention thus applies to harvesting a stand of crop material as well as harvesting crop material that is no longer standing, such as picking crop material up off the ground after it has been cut and laid on the ground by prior agricultural machine system(s).

Yet another advantage of the present invention is that it provides for reduced operator fatigue, for automatic or semi-automatic harvesting operations, for technology that can be applied to a multitude of agricultural processes, for the option of supplementing GPS auto-guidance systems to further improve their accuracy, for the option of pairing with aftermarket steering wheel mounted steering kits to control older tractors, and for detecting obstacles ahead of the tractor or other work vehicle.

Yet another advantage of the present invention is that it provides for adjusting future agricultural machine actions based on positive or negative results of previous agricultural machine actions. Thus, the present invention provides for machine learning.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle, agricultural baler, and/or components thereof are usually determined with reference to the direction of forward operative travel of the agricultural vehicle and/or agricultural baler, but they should not be construed as limiting. The terms "longitudinal" and "transverse" are determined with reference to the fore-and-aft direction of the agricultural vehicle and/or agricultural baler and are equally not to be construed as limiting. The terms "downstream" and "upstream" are determined with reference to the intended direction of crop material flow during operation, with "downstream" being analogous to "rearward" and "upstream" being analogous to "forward."

Figure 1:
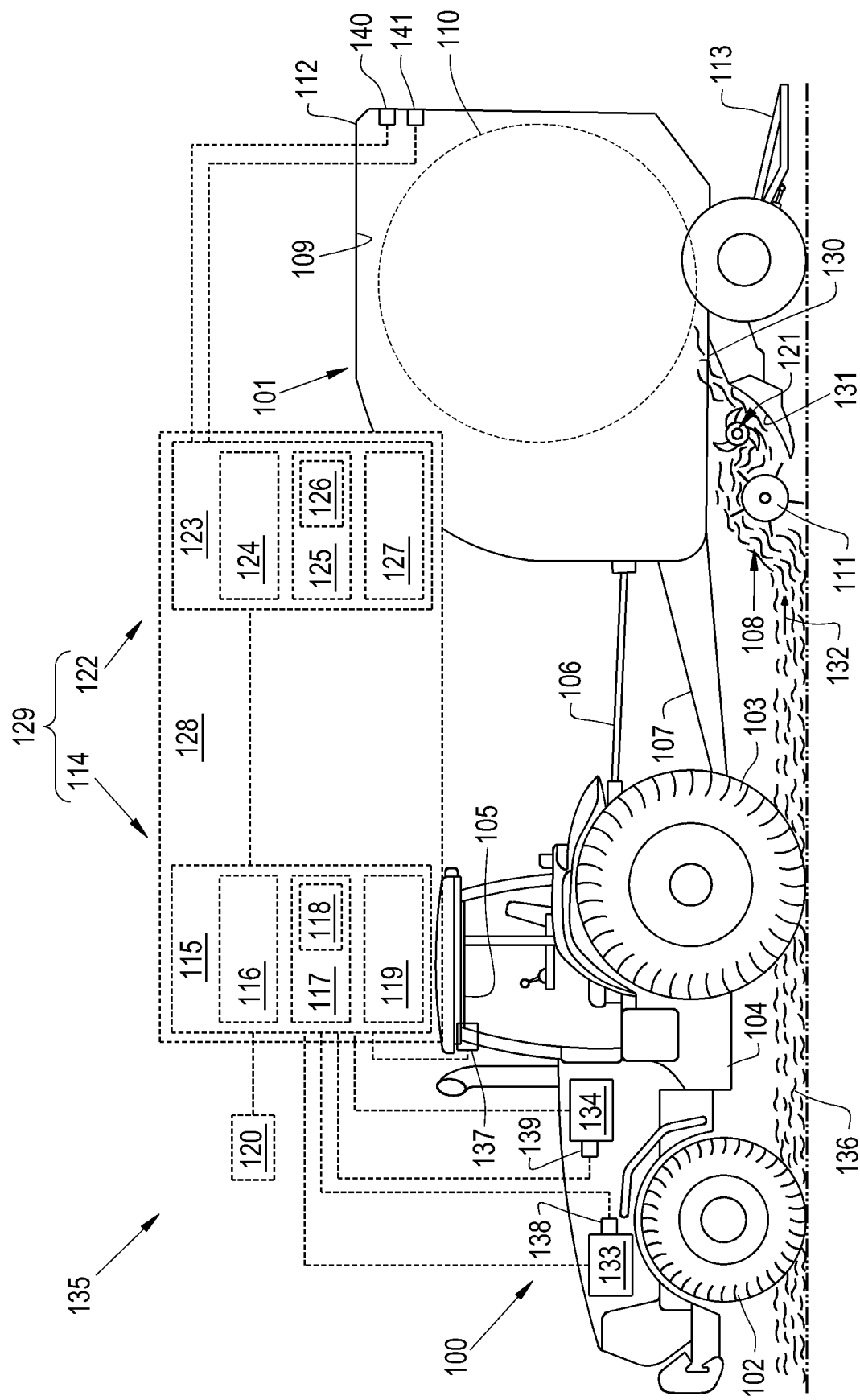
FIG. 1 illustrates a side view of an exemplary embodiment of an agricultural baler system including an agricultural vehicle, formed as a tractor, and an agricultural baler, the agricultural baler system including a control system, in accordance with an exemplary embodiment of the present invention.

Referring now to the drawings, and more particularly to FIG. 1, there is shown an embodiment of an agricultural machine system 135 including an agricultural work vehicle 100 (which can be referred to as a work vehicle, or an agricultural vehicle) and an agricultural machine 101 (which can be referred to as an agricultural implement, or an implement), which is being towed by, and thus coupled with, agricultural work vehicle 100, in accordance with the present invention, to perform an agricultural operation within a field. As shown, work vehicle 100 can be configured as an agricultural tractor, and agricultural machine 101 can be configured as a baler 101, such as a round baler 101, in accordance with an exemplary embodiment of the present invention, tractor 100 pulling baler 101 to perform a baling operation within the field (in this case, agricultural machine system 135 is an agricultural baler system 135). In accordance with the scope of the present invention, agricultural machine 101 can be any agricultural machine performing an agricultural operation in a field, such as a mower, a tedder, a rake, a merger, a chopper, a baler, and/or a self-loading forage wagon. Further, agricultural machine system 135 includes a control system 129 (which can be referred to as a unified control system 129). Unified control system 129 includes control system 114 of tractor 100 and control system 122 of baler 101. Control system 114 includes controller 115, and control system 122 includes controller 123. Further, unified system 129 can be said to include controller system 128, which includes controllers 115, 123. Control system 114, in whole or in part, is further included as part of work vehicle 100, and control system 122, in whole or in part, is further included as part of baler 101.

Work vehicle 100 can be an operator-driven tractor or an autonomous tractor. However, in some embodiments, work vehicle 100 may correspond to any other suitable vehicle configured to tow a baler across a field or that is otherwise configured to facilitate the performance of a baling operation, including an autonomous baling vehicle. Additionally, as shown, baler 101 can configured as a round baler configured to generate round bales. However, in some embodiments, baler 101 may have any other suitable configuration, including being configured to generate square or rectangular bales. It should be further appreciated that baler 101, while shown as being towed by tractor 100, may also be a self-propelled baler that does not rely on a separate vehicle for propulsion and/or power to function. While the present invention is described with respect to a baler, it can be appreciated that the present invention can be used in conjunction with other agricultural systems and machines, such as vehicles and/or implements. Any implement of the present invention may be front mounted (pushed), rear mounted (pulled), towed, or may be a part of or formed as a self-propelled vehicle or implement.

Work vehicle 100 includes a pair of front wheels 102, a pair of rear wheels 103, and a chassis 104 (which can also be referred to as a work vehicle frame 104) coupled to and supported by the wheels 102, 103. An operator's cab 105 may be supported by a portion of the chassis 104 and may house various input devices for permitting an operator to control the operation of work vehicle 100 and/or baler 101. Additionally, work vehicle 100 may include an engine and a transmission mounted on chassis 104. The transmission may be operably coupled to the engine and may provide variably adjusted gear ratios for transferring engine power to wheels 103 via a drive axle assembly. Work vehicle 100 further includes a steering mechanism 133 and a ground speed mechanism 134, each coupled with frame 104. Steering mechanism 133 is well-known and thus will not be discussed in detail, but generally serves to steer work vehicle 100. Steering mechanism 133 is operatively coupled with control system 114 by, for example, any suitable sensors and actuators known in the art for automatically controlling steering mechanism 133 of an automotive vehicle, wherein such sensors and actuators can be deemed to be included within both steering mechanism 133 and control system 114. Such sensors include one or more steering sensors 138 configured for sensing a linear and/or rotational position of an operative mechanism of steering mechanism 134 corresponding to a steering angle of work vehicle 100 (such a steering angle can be an angle relative to a longitudinal axis extending through a longitudinal midline of work vehicle 100) and for outputting a steering angle signal corresponding to the steering angle to controller 115. Ground speed mechanism 134 is well-known and thus will not be discussed in detail, but generally serves to cause work vehicle 100 to accelerate, to decelerate, or to maintain a constant speed across the ground, such as a field. For purposes herein, ground speed mechanism 134 can further include a braking system of work vehicle 100, which is well-known and thus will not be discussed in detail, but generally serves to cause the work vehicle to slow down or to stop. Ground speed mechanism 134 is operatively coupled with control system 114 by, for example, any suitable sensors and actuators known in the art for automatically controlling ground speed mechanism 134 of an automotive vehicle, wherein such sensors and actuators can be deemed to be included within both ground speed mechanism 134 and control system 114. Such sensors include one or more ground speed sensors 139 configured for sensing a ground speed of work vehicle 100 and for outputting a ground speed signal corresponding to the ground speed to controller 115. Control system 114, in whole or in part, can be coupled with frame 104.

As shown in FIG. 1, work vehicle 100 may be coupled to baler 101 via a power take-off (PTO) 106 and a tongue 107 to a hitch of work vehicle 100 to allow vehicle 100 to tow baler 101 across the field. As such, work vehicle 100 may, for example, guide baler 101 toward crop material 136 deposited in windrows on the field. As is generally understood, to collect the crop material 136, baler 101 includes a feeder system 108 (which can be referred to generally as a crop collector) mounted on a front end of baler 101. Feeder system 108 may, for example, include a pickup assembly 111, a rotor and auger arrangement 121, and a floor 131. Pickup assembly 111 includes a rotating wheel with tines that collect crop material 136 from the ground and direct crop material 136 toward a bale chamber 109 of baler 101, while rotating clockwise (in FIG. 1), as is known. Rotor and auger arrangement 121 is configured to push or otherwise to move crop material 136 towards or into bale chamber 109, while rotating counter-clockwise (in FIG. 1), as is known. FIG. 1 shows crop material 136 lying in a windrow on the ground of the field and being picked up by pickup assembly 111. Upon being picked up, crop material 136 flows over pickup assembly 111 and ultimately under rotor and auger arrangement 121, as indicated by arrow 132, which indicates the normal flow direction 132 of crop material 136 relative to feeder system 108. FIG. 1 shows baler 101 schematically and thus with one pair of wheels, though it can be appreciated that baler 101 can include one or more additional pair of wheels, as in FIG. 2.

Inside bale chamber 109, rollers, belts, and/or other devices compact the crop material 136 to form a generally cylindrically-shaped bale 110. Bale 110 is contained within baler 101 until ejection of bale 110 is instructed (e.g., by the operator and/or baler controller 123 of baler 101). In some embodiments, bale 110 may be automatically ejected from baler 101 once bale 110 is formed, by baler controller 123 detecting that bale 110 is fully formed and outputting an appropriate ejection signal. Further, work vehicle 100 includes control system 114, which includes controller 115, which includes a processor 116, memory 117, data 118, and instructions 119. Control system 114 can further include an input/output device 120 such as a laptop computer (with keyboard and display) or a touchpad (including keypad functionality and a display), device 120 being configured for a user to interface therewith.

As shown in FIG. 1, baler 101 may also include a tailgate 112 movable between a closed position (as shown in the illustrated embodiment) and an opened position via a suitable actuator assembly. Tailgate 112 and/or the actuator assembly may be controlled to open and close by baler controller 123. In the closed position, tailgate 112 may confine or retain bale 110 within baler 101. In the open position, tailgate 112 may rotate out of the way to allow bale 110 to be ejected from the bale chamber 109. Additionally, as shown in FIG. 1, baler 101 may include a ramp 113 extending from its aft end that is configured to receive and direct bale 110 away from baler 101 as it is being ejected from bale chamber 109. In some embodiments, ramp 113 may be spring loaded, such that ramp 113 is urged into a raised position, as illustrated. In such embodiments, the weight of bale 110 on ramp 113 may drive ramp 113 to a lowered position in which ramp 113 directs bale 110 to the soil surface. Once bale 110 is ejected, bale 110 may roll down ramp 113 and be deposited onto the field. As such, ramp 113 may enable bale 110 to maintain its shape and desired density by gently guiding bale 110 onto the field. Further, baler 101 includes control system 122, which includes controller 123, which includes a processor 124, memory 125, data 126, and instructions 127. Controller 123 can communicate with controller 115, so that controller 115 outputs information to the display of input/output device 120 of work vehicle 100, thereby informing a user of various conditions of baler 101 and bales 110 forming or formed therein. Further, baler 101 includes a frame 130 (which can be referred to as baler frame 130, or more generally as a machine frame 130) to which all of the components of baler 101 are directly or indirectly coupled. Thus, feeder system 108 and thus also pickup assembly 111 and rotor and auger arrangement 121 are coupled with frame 130. Control system 122, in whole or in part, can be coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of baler 101 described above and shown in FIG. 1 is provided only as one example. Thus, it should be appreciated that the present disclosure may be readily adaptable to any manner of baler configuration, or other agricultural machines, such as a vehicle and/or implement, as indicated above. For example, as indicated previously, baler 101 may, in some embodiments, correspond to a square baler configured to generate square or rectangular bales. It should be further appreciated that the illustration of baler 101 in FIG. 1 is schematic.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases.

Tractor controller 115, herein, is assumed to be the primary controller for controlling operations of tractor 100, and baler controller 123, herein, is assumed to be the primary controller for controlling operations of baler 101. Both controllers 115, 123, as indicated in FIG. 1, can be in communication with the other of controllers 115, 123, thereby forming unified control system 129, such that any or all information associated with either controller 115, 123 can be shared with the other controller 115, 123, and either controller 115, 123 can perform the functions of the other controller 115, 123. Controllers 115, 123 can communicate with each other in any suitable manner, such as a wired connection or a wireless connection, such as radio signals (RF), light signals, cellular, Wi-Fi®, Bluetooth®, Internet, via cloud-based devices such as servers, and/or the like. Further, while not shown, both controllers 115, 123 can communicate with a remotely located data center (which can also be a part of unified control system 129), which controllers 115, 123 can communicate with by any suitable way, such as those just referenced. Such a data center can include its own controller (and thus processor(s), memory, data, and instructions, substantially similar to that described above with respect to controllers 115, 123) which can be configured to perform any of the functions associated with controllers 115, 123. Controllers 115, 123 and the data center can be a part of any network facilitating such communication therebetween, such as a local area network, a metropolitan area network, a wide area network, a neural network, whether wired or wireless. Control system 129, and controller system 128, are operatively coupled with tractor 100, baler 101, steering mechanism 133 (such as by way of an actuator of steering mechanism 133), and ground speed mechanism 134 (such as by way of an actuator of ground speed mechanism 134). According to an embodiment of the present invention, tractor controller 115 can issue commands to baler controller 123. This is assumed to be the case herein, unless otherwise stated. According to an alternative embodiment of the present invention, baler controller 123 can issue commands to tractor controller 115 (such as for ISOBUS III or higher implements and/or vehicles). This is assumed to be the case herein, unless otherwise stated. According to an alternative embodiment of the present invention, for non-ISOBUS III or higher implements and/or vehicles, a steering assist kit (similar to aftermarket kits for GPS auto-steering) can be installed on tractor 100 and can be controlled by the interpretation of input signals from visual sensor(s) 137 and implement sensors (i.e., sensors 140, 141). According to another embodiment of the present invention (which is not assumed to be the case herein, unless otherwise stated), rather than steering tractor 100 based on inputs from, for example, sensors 137, 140, 141 and outputs from controller 115 and/or 123 (below), baler 101 can be steered instead, using, for example, an actuated hitch (used to connect tractor 100 and baler 101 together) or a steerable axle on baler 101.

Control system 129 can include additional sensors or other inputs. Control system 114 can further include a GPS (not shown) mounted on tractor 100 (the tractor GPS). The tractor GPS senses the location of tractor 100 within the field, as is known, and this data can be provided to controller 115, 123. Similarly, control system 122 can further include a GPS (not shown) mounted on baler 101 (the baler GPS). The baler GPS senses the location of baler 101 within the field, as is known, and this data can be provided to controller 115, 123. Further, the operator, by way of device 120, can input or make certain settings, for example, a near full bale setpoint, and a full bale setpoint, "full" being associated with a completion of the formation of bale 110 within bale chamber 109.

In a field, there are distinct visual "lines" that are created as a result of harvesting operations. Such lines may be, for example, the separation between crop stubble and standing un-cut crop, or between crop stubble and a windrow of crop material laid down by a mower or created by a rake. In accordance with the present invention, such lines can be monitored with visual sensors, such as sensors 137 (whose images can be monitored by controller 115, 123, 128, for example, in order to detect such lines, as a contrast between crop material 136 and the ground), in order to guide harvesters (referenced above as various agricultural machines, including mowers and balers) and thereby to maximize capacity.

Control system 114 further includes one or more sensors 137 coupled with frame 104 (or, alternatively, on frame 130). Sensors 137 can be coupled with frame 104 in any suitable location, such as in any place where sensors 137 have a clear line of sight of the windrow of crop material 136 to be followed, such as on tractor 100 and/or baler 101, though it is assumed herein (unless stated otherwise) that sensors 137 are part of tractor 100; for example, sensors 137 can be located high on cab 105 in order to be able to observe to the front and/or sides of tractor 100 (a description of one sensor 137 applies to all such sensors 137 unless otherwise stated). Sensor 137 is operatively coupled with controllers 115, 123 (controller system 128). Sensor 137 is configured for sensing whatever is in the field of view of sensor 137 and thus can be any suitable sensor. Sensor 137 can be an optical or visual sensor, such as a camera, or a lidar sensor. Sensor can also be a radar sensor (which can be deemed to be a kind of image, optical, or visual sensor herein). Sensors 137 can employ a plurality of such different types of sensors. By way of such sensing, sensor 137 can generate images corresponding to what is sensed. Sensor 137 is also configured for outputting an image signal corresponding to the images sensed by sensor 137 to controller 115. The images can be taken continuously by sensor 137. These images can be associated with one or more operative parameters employed by controllers 115, 123. The primary focus of the visual field (meant to apply to any type of sensor 137, such as cameras, lidar sensors, or radar sensors) is primarily the windrow of crop material 136 lying ahead in a path of travel of tractor 100, considering that tractor 100 guides off of the windrow of crop material 136 in order for baler 101 to pick up crop material lying in windrows on the ground. The images sensed by sensor 137 can be processed by sensor 137, by controller 115, 123, and/or by an off-site controller associated with control system 129. It is assumed herein, unless stated otherwise, that the images from sensors 137 are processed by controller 115. The images sensed by sensor 137, in particular of the windrow of crop material 136 and the surrounding environs of the windrow, include at least one operative parameter used by controller 115 for further outputs (actions). Such operative parameters include, by example and not by way of limitation, windrow position, windrow shape, windrow size, windrow density, and windrow edge. The windrow position can be relative to a tractor 100 and/or baler 101. For instance, during processing of the images from sensor 137, controller 115 can determine a longitudinally extending centerline of the windrow and can determine the position of this longitudinal centerline of windrow relative to a longitudinally extending centerline, for example, of tractor 100 and/or baler 101, and thereby controller 115 can know whether tractor 100 and/or baler 101 is transversely offset, and to what extent, tractor 100 and/or baler 101 is relative to the longitudinal centerline of the windrow. Thus, controller 115 can determine the relative position of tractor 100 and/or baler 101 relative to the windrow of crop material 136. The windrow shape can refer to, for example, the longitudinal path that windrow takes extending forward on a single windrow (for example, a straight windrow, a straight windrow with a single curve or multiple curves), and/or can refer to a transverse cross-sectional shape of the windrow, wherein, for example, the windrow may be higher on the left than the right. The windrow size, which is related to the transverse cross-sectional shape of the windrow, can refer to the height of the windrow across its transverse extent; for example, the windrow may be high on its left one-third section, lower in the middle one-third section, and yet even higher on the right one-third section than the other two one-third sections. The image processing can break down the transverse extent into any suitably sized increments. The windrow density can refer to the amount of crop material in a particular portion of the windrow, for example, when considering the windrow in its transverse cross-sectional extent. For instance, the windrow may have more density on its left half than its right half. The windrow edge refers to the two transverse edges of the windrow (the transverse width of windrows can be less than the transverse width of a pickup of pickup assembly 111 of baler 101, such that a space can exist between a left edge of the pickup of pickup assembly 111 and the left edge of the windrow, and another space can exist between a right edge of the pickup of pickup assembly 111 and the right edge of the windrow). Controller 115 can use, for example, Canny Edge Detection software, or Hough Transform software, in order to apply windrow edge detection techniques and thereby to detect these edges. Detecting the left and right edges can be used to determine the longitudinal centerline of the windrow (spaced at the midline running between the two edges, which are transverse edges, of the windrow). Thus, sensor 137 is configured sensing an operative parameter of a windrow of crop material 136, and for outputting an operative parameter signal corresponding to this operative parameter to controller 115, 123. Though it is contemplated herein to align a longitudinal centerline of tractor 100 and/or baler 101 with the longitudinal centerline of the windrow, according other embodiments of the present invention (1) a non-central axis can serve as the machine system reference, such as a baler auger, or (2) upon determining a crop density distribution of the windrow of crop material 136 using sensors 137 and controller 115, the longitudinal centerline of tractor 100, for example, can be centered on a more dense portion of the windrow rather than the longitudinal centerline of the windrow.

Control system 122 further includes one or more bale shape sensors 140 and one or more bale size sensors 141, sensors 140, 141 being coupled with frame 130 and operatively coupled with controllers 115, 123 (controller system 128) (a description of one sensor 140 applies to all such sensors 140 unless otherwise stated, and a description of one sensor 141 applies to all such sensors 141 unless otherwise stated). Sensors 140, 141 are used, at least in part, to determine the navigational needs of baler 101. Bale shape sensor 140 can be positioned in any suitable location, such as within a left half (transversely) of baler 101 and within a right half of baler 101, and on any suitable structure, such a wall of baler 101 (side wall, top wall, back wall, rear wall, front wall), or any other structure. Bale shape sensor 140 can be configured for sensing a shape of a bale 110 forming or formed within bale chamber 109, and can output a bale shape signal corresponding to the shape of bale 110 to controller 123, 115. A desired shape of bale 110 is has an even shape, namely, a generally cylindrical shape (having a transversely extending cross-section of rectangle). Control system 129 would thus seek to correct the shape of bales forming with undesirable transversely extending cross-sectional shapes, which include, for example, a bale with a barrel shape (too much crop material 136 fed to the center), a bale with a peak to the left of center (too much crop material 136 fed to the left side of bale chamber 109), or a bale with a peak to the right of center (too much crop material 136 fed to the right side of bale chamber 109). The shape of bale 110 can be an operative parameter employed by controllers 115, 123. Thus, bale shape sensor 140 is configured for sensing the bale shape of crop material 136 in bale chamber 109, and for outputting to controllers 123, 115 a bale shape signal corresponding to the bale shape. Bale size sensor 141 can be positioned in any suitable location, such as on any suitable structure, such as a side wall of baler 101. Bale size sensor 141 can be configured for sensing a size of a bale 110 forming within bale chamber 109, and can output a bale size signal corresponding to the size of bale 110 to controller 123, 115. The size of interest of bale 110 can be, for example, a diameter and/or a length of bale 110 forming or formed in bale chamber 109. The size of bale can be an operative parameter employed by controllers 115, 123. Thus, bale size sensor 141 is configured for sensing a size of crop material 136 in bale chamber 109, and for outputting to controllers 123, 115 a bale size signal corresponding to the bale size. Further, control system 114 can further include at least one engine load sensor coupled with frame 104, and/or control system 122 can include at least one implement load sensor, such as a PTO load sensor, coupled with frame 130. These sensors can output respective load signals to controller 128, which can use these signals to determine a ground speed adjustment, with respect to ground speed mechanism 134.

According to an exemplary embodiment of the present invention, visual sensors 137 send their image signals to controller 115, the images upon which the image signals are based being of the windrow of crop material 136 that is being followed and, optionally, additional environs in front of and/or about system 135. Controller 115 receives these image signals and processes them so as to calibrate a perspective of sensors 137 relative to the windrow, for example, and to apply edge detection techniques to determine the location of the left and right edges (from a top view) of the windrow (such as, via contrast differences) relative to tractor 100 and/or baler 101. Once controller 115 has coordinated the location of tractor 100 and/or baler 101 relative to the windrow edges, controller 115 can generate or otherwise project a windrow centerline path—corresponding to the longitudinal centerline of the windrow—and can output commands so as to control the steering angle of tractor 100 (associated with steering mechanism 133) as required to follow the windrow centerline path, unless commanded otherwise. Further, controller 115 can receive input the tractor GPS in terms of the location of tractor 100. Controller 115 can also receive input from shared GPS data (or, which can already be stored in controller 115) from a prior harvesting operation, such shared GPS data being, for instance, the location of a mower during a prior mowing operation as the mower traversed the field, mowing crop material 136 and laying down the crop material 136 into windrows, the shared GPS data thus showing the anticipated location of windrows from the mowing operation.

Further, controller 123 monitors and receives inputs from bale shape sensor(s) 140 and bale size sensor(s) 141 to determine whether additional steering correction commands are needed. For example, if sensors 140 and/or 141 sense that the left side of bale chamber 109 has less crop material 136 than the right side of bale chamber 109, controller 123 will command steering mechanism 133 (such as by way of controller 115, wherein controller 123 issues a command to controller 115, and controller 115 issues a command to steering mechanism 133) to adjust the steering angle of tractor 100 to veer tractor 100 and thus also baler 101 rightward until the left edge of the windrow is aligned with the left side of the pickup of baler pickup assembly 111; controller 123 may also issue a command, by way of controller 115, to ground speed mechanism 134 to adjust the speed to tractor 100. Once a distribution of crop material 136 has been balanced in bale chamber 109, controller 123 of baler 101 will command controller 115 of tractor 100 to return to the windrow centerline path that has been projected. This can be repeated many times as needed through the baling operation, so that bale chamber 109 is filled evenly with crop material 136, in order to form a balanced bale 110 in bale chamber 109. As a result, tractor 100 and baler 101 can perform a weave pattern during the course of baling a windrow of crop material 136. Further, based at least in part on the images from sensors 137 to controller 115, controller 115 may be configured to detect obstacles (i.e., a large boulder) in the field and thus adjust steering mechanism 133 to cause tractor 100 and baler 101 to steer around and thus to avoid the obstacle.

The above-description of the present invention can apply in a non-machine learning context and also in a machine learning context. What follows is focused primarily on how the above-described present invention applies in a machine learning context. Generally speaking, machine learning is the ability of a machine, namely, a computer (even more specifically, a controller), to make predictions based on past experiences so as to achieve more optimal results. Past experiences can also be thought of as prior data. There are essentially three types of machine learning, namely, supervised learning, unsupervised learning, and reinforcement learning, each of which is well-known in the art. Generally speaking, with supervised learning a controller receives labeled data, identifies patterns in the labeled data (i.e., features that distinguish one type of labeled data from another type of labeled data), and makes predictions on new data based thereon. With unsupervised learning, the controller receives unlabeled data, recognizes patterns in the data in order to segregate the data, and makes predictions on new data based thereon. With reinforcement learning, the controller (the agent) tries to perform a task (the ultimate goal) and thus is placed in a specific environment (everything but the controller) in which to perform the task without first receiving labeled or unlabeled data. The controller, beginning from its initial state (defined by any number of operative parameters and refers to the current situation that the agent finds itself in within the environment) which can be sensed by sensors and received by the controller, takes actions (the output of the controller, such as a signal to an actuator) and thereby changes its state in an effort to reach a given goal and thus accomplish the task. Based on various episodes (defined past experiences or iterations) involving exploration wherein the controller receives rewards and/or punishments (i.e., plus or subtraction of points) based on correct or incorrect actions (which can be of varying degrees), the controller eventually exploits the knowledge the controller has obtained from exploration to achieve the goal, or to at least draw nearer to the goal. Thus, with reinforcement learning, the agent is not told which action to take but discovers which actions yield the most reward (which will lead the agent to the ultimate goal), generally speaking, by trial and error. The agent then endeavors to figure out a "policy;" the policy is a kind of roadmap showing which action the agent should pursue from any particular state in order to achieve the highest reward and thereby reach the ultimate goal. Depending upon the application of reinforcement learning, training of the agent can occur before testing and deploying the agent, such as on a computer simulator and/or in the real world, wherein the agent is permitted to explore a great deal (compared to exploiting whatever rewarded paths the agent has found, which can risk finding even better paths to the goal if the agent is not given sufficient amount of time to explore various paths). As the agent improves and thus learns more about how to achieve a more optimal path toward the goal, the agent can be instructed to explore less and exploit more what it has already learned. After a sufficient amount of training has occurred, the agent can be tested, such as in a real world environment, to verify that the agent has learned well, rather than making too many "mistakes" in exploration or in exploitation. Upon achieving sufficiently satisfactory results (though not perfect), the agent can be deployed in the real world, with instructions to exploit what it has learned but yet still giving the agent an opportunity to explore other, possibly even better (higher reward), paths.

In accordance with an exemplary embodiment of the present invention, the present invention employs supervised learning. In this vein, machine learning algorithms that can be used include, for example and not by way of limitation, Linear Regression, Logistic Regression, Support Vector Machine, K-Nearest Neighbors, and Random Forest. In accordance with another exemplary embodiment of the present invention, the present invention employs unsupervised learning. In this vein, machine learning algorithms that can be used include, for example and not by way of limitation, K-Means, Apriori, and C-Means. In accordance with yet another exemplary embodiment, the present invention employs reinforcement learning. In this vein, machine learning algorithms that can be used include, for example and not by way of limitation, Q-Learning, and SARSA (State-Action-Reward-State-Action). Optionally, the present invention can employ one or more of these types of learning, in any suitable combination. What follows assumes that the present invention uses primarily reinforcement learning, unless otherwise stated. Accordingly, each of controller 115 and controller 123 can be deemed a separate agent 115, 123, respectively, and controller system 128 can be deemed an agent 128 when agents 115, 123 are viewed collectively. The environment of agent 128 is anything that is not agent 128, including remaining portions of control system 129 and remaining portions of tractor 100 and baler 101. A current state of the agent 115, 123, 128, then, is any current situation that agent 115, 123, 128 finds itself in when system 135 is harvesting a windrow of crop material in a field, as defined by various parameters, such as what is sensed by sensors 137, 140, 141, the tractor GPS, and the baler GPS, the steering angle associate with steering mechanism 133, the ground speed associated with ground speed mechanism 134, and the initial settings. What constitutes a prior episode is discussed further below. The agricultural baler system 135 can undergo training by way of computer simulation and by interaction within an actual field to be harvested, starting first with computer simulation and then moving to an actual field. After training, system 135 can be tested in an actual field and eventually deployed for use within an actual field, such that by this time system does more exploitation than exploration, though exploration still occurs during deployment in the actual field so that system 135, in particular control system 129, can continue to improve from past episodes obtained by computer simulation and in an actual field. The focus herein is primarily on deployment of system 135, with both exploration and exploitation occurring, such that machine learning still occurs, while system 135 can generally perform competently in an actual field. Further, system 135 can operate entirely automatically, remotely, and/or with an operator, wherein system 135 can operate automatically but operator can override the automation and control system 135 (in this way, operator and system 135 can operate cooperatively).

By way of machine learning, in general the focus of the machine learning of the present invention is to allow control system 129 to produce an output path for system 135 to follow based on input data, thus adapting to and learning from past experiences (that is, prior episodes). System 135 is enhanced by applying a machine learning algorithm in controller system 128 (that is, in controller 115 and/or 123) which monitors the change in bale shape and bale size with respect to ground speed to generate (that is, to predict) an optimized "weave pattern" path to navigate the visually sensed windrow of crop material 136. Such predictive guidance is thus based upon bale shape, bale growth (size), ground speed, and windrow geometry. Bale shape and size are relative to the position of tractor 100 relative to windrow position, shape, and size. Control system 129 is adjusting future machine 135 actions based on positive or negative results of previous machine 135 actions.

For example if system 129 is driving a generic path with tractor 100 centered on the windrow and bale shape sensors 140 and/or bale size sensors 141 indicate the left side of bale chamber 109 is less full than the right side of bale chamber 109, system 129 will steer tractor 100 towards the right edge of the windrow to allow more filling of the left side of bale chamber 109. The amount of steering, tractor centerline to windrow centerline offset and the time at a certain ground speed required to fill the left side of bale chamber 109 to a desired level all can be learned and optimized by prior episodes (experiences), which is the goal of the machine learning.

By way of further example, if control system 129 is seeing a narrow (transverse width) and short (height) windrow of crop material 136 ahead, control system 129 can predict a need to adjust the position of system 135 for a longer time to obtain the desired result (an even bale 110 within bale chamber 109) compared to a wider and taller windrow which might be seen ahead. Further, if control system 129 sees a windrow as wide as the pickup of pickup assembly 111, system 135 can likely stay in the center of the windrow (aligning the longitudinal centerline of tractor 100 with the longitudinal centerline of the windrow) and maintain good bale shape and size. But, in that same windrow, if control system 129 sees a section of the windrow that is narrower ahead, control system 129 may predict that a weave pattern (curving left and right in alternating fashion as long as needed) must be employed to maintain even filling of bale chamber 109. The machine learning thus provides that control system 129 learns from prior episodes/experiences it has encountered during a baling process to produce a travel path that most efficiently fills bale chamber 109 utilizing the input data from sensors 137, 140, 141, and/or the tractor and baler GPS's.

An advantage of using a machine learning approach, as opposed to a non-machine learning approach to the control system, is that the machine can learn how best to optimize the baling operation over time (through various prior baling episodes), which can be helpful when a variety of factors are involved. By contrast, without using a machine learning approach, the designer of the software used in the control system 129 would need to anticipate a variety of circumstances and eventualities and provide positive instructions for control system 129 to take in such situations, which may not provide optimal results in practice.

A prior episode, generally speaking, is a prior experience of system 135, wherein prior data is obtained by sensors 137, 140, 141, and the GPS's. Conversely, a prior episode is not what system 135 is currently experiencing by way of sensors 137, 140, 141, and the GPS's. By way of example and not limitation, an episode (whether a prior episode or a current episode) can be defined: as a single field (but this can be too large); as a single windrow of crop material 136; as a specified distance, likely to be less than an average length of a windrow within a given field to be harvested; a crop type; a crop condition (i.e., crop moisture content); or by general scenarios. According to the present invention, the operator can define the episode by inputting this within device 120 as an initial setting prior to conducting a baling operation. Thus, a given episode is completed when the windrow or the selected distance is traversed, or when any of the general scenarios occurs. The agent 115, 123 can recognize when an episode has occurred and store it within memory as a past episode, from which agent 115, 123 can learn and endeavor to improve by further exploration or to exploit. In terms of general scenarios, such scenarios can include or correspond to, for example and not by way of limitation: over-filling the left side or the right side of bale chamber 109; steering too frequently (an overly-high-frequency steering); steering with too much magnitude (an overly-high-magnitude steering); traveling too fast (an overly-high ground speed) or too slow (an overly-slow ground speed); and an inadequate steering when the windrow includes a blown-over section. Standards can be input by device 120 during initial settings to define what these scenarios mean. Thus, when agent 115, 123 recognizes any such scenario from a prior episode in a current episode (at least by analogy, when not an exact comparison), agent 115, 123 can learn from this past episode and further explore better actions (so as to find higher rewards or less punishment), by changing any number of variables, depending upon the situation.

Before proceeding to additional examples, in sum controller system 429-128 is configured for: (a) receiving operative parameter signals corresponding to any of the operative parameters sensed by sensors 137, 140, and/or 141; (b) learning from a prior episode (namely, a prior harvesting episode, such as a prior baling episode when harvesting is in the form of baling); (c) determining a first mechanism adjustment signal and/or a second mechanism adjustment signal based at least in part on the prior baling episode and the ultimate desired goal (filling the bale chamber 109 with crop material 136 evenly at optimal ground speed); and (d) outputting the first mechanism adjustment signal and/or the second mechanism adjustment signal so as to adjust respectively the first mechanism and/or the second mechanism in order to fill the bale chamber 109 evenly with crop material 109, wherein success in such even filling of crop material 109 is learned and may occur only after many prior episodes. Regarding (c) and (d), the first adjustment mechanism is steering mechanism 133, and the second adjustment mechanism is ground speed mechanism 134, and first mechanism adjustment signal and second mechanism adjustment signal are signals from controller 115 and/or 123 respectively to mechanisms 133 and 134 respectively, in particular, to the actuators of or associated with these mechanisms 133, 134 used to adjust mechanisms 133, 134 respectively.

What follows next is a series of five examples where control system 129 learns from prior episode(s). While only one or two prior episodes are described in each example, it can be appreciated that several episodes may be required (during training and/or during deployment) to achieve an optimal or near-optimal result. Each example involves a situation that system 135 can encounter in an actual field during baling. These are not the only situations that system 135 may encounter but are only a sampling, considering the nature of field and baling conditions. Indeed, system 135 can encounter a myriad of different situations, all of which can be optimized using machine learning.

The first example concerns over- or under-filling the left or right side of baler 101. In episode 1 (a prior episode), if the left side of bale chamber 109 is less full than the right side of bale chamber 109, and control system 129 steers tractor 100 such that the longitudinal centerline of tractor 100 is offset (relative to the longitudinal centerline of the windrow) towards the right side of the windrow at a certain ground speed for a certain amount of time until system 135 fills the left side of bale chamber 109 and then steers tractor 100 back to center (such that the longitudinal centerlines of tractor 100 and the windrow are now substantially aligned) and then, unfortunately, the left side of bale chamber 109 has become too full (over-filling the left side of baler 101), control system 129 will then have to steer system 135 to the left side of the windrow in order to try and fill more of the right side of bale chamber 109 to compensate for the over-filling of the left side of bale chamber 109. In episode 2 (a current episode), in a similar situation to episode 1, control system 129 can learn from episode 1 and thereby reduce the amount of time it travels in the offset position before returning to center so that when system 135 returns to center it has not over-filled the left side of baler 101. Though this first example focuses on over-filling the left side, it can be appreciated that the right side could be over-filled, and that either side could be under-filled, all of which would need to be learned from and corrected.

The second example concerns tractor speed control based on windrow capacity. In episode 1 (a prior episode), sensors 137 (the visual system) sees a wide windrow, and baler 101 takes 80 seconds for the bale size to reach the size of a full bale 110 at a ground speed of 4 miles per hour (mph). In episode 2 (a prior episode but following episode 1), sensors 137 see a narrow windrow, and baler 101 takes 150 seconds for the bale size to reach the size of a full bale 110 at a ground speed of 4 mph. This is not optimal, as it is taking too long for system 135 to fill bale chamber 109. Thus, through a system of rewards and punishments, some of which can relate to the efficiency of filling bale chamber 109, control system 129 can learn to be efficient with respect to the width of the windrow (which can correspond to the quantity of crop material 136) and ground speed. For instance, as is known, ground speed can generally be based upon such factors as shape, size, density, and volume of the windrow. If the windrow is lighter, baler 101 can go faster; but, if heavier, it is not optimal to go too fast, which can cause a plug. In episode 3 (the current episode, following episodes 1 and 2), sensors 137 see a narrow windrow, and control system 129 adjusts—based on learning from prior episodes 1 and 2—the ground speed to X mph for the bale size to reach the size of a full bale 110 in 80 seconds.

Figure 2:
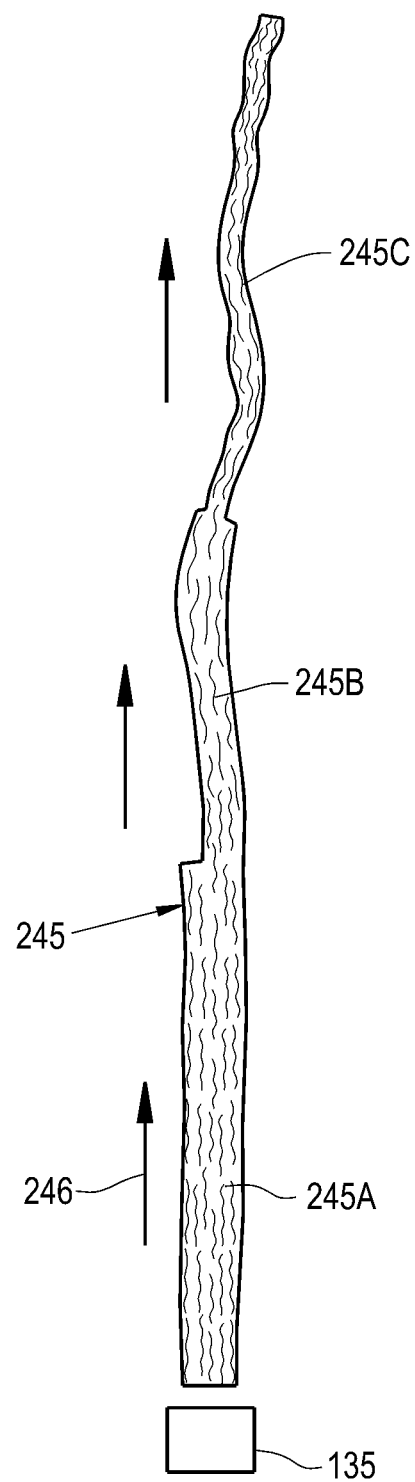
FIG. 2 illustrates a top view of the agricultural baler system baling a windrow of crop material in a field, in accordance with an exemplary embodiment of the present invention.

FIG. 2, which is referred to now, assists with explaining the second example, FIG. 2 shows schematically a top view of agricultural baler system 135 harvesting a windrow 245 in a field. More specifically, FIG. 2 generally illustrates episode 3 of the just mentioned second example, but showing not merely one transition in terms of a narrowing windrow but two such transitions, resulting in three sections of the windrow. In FIG. 2, baler system 135 travels the length of windrow 245 in direction 246. Windrow 245 is shown with three different sections: 245A (the widest section among 245A, 245B, 245C); 245B (a section narrower than section 245A but wider than section 245C); and 245C (the narrowest section among 245A, 245B, 245C). More specifically, section 245A is as wide as the pickup of pickup assembly 111; section 245B is narrower than the pickup of pickup assembly 111; and section 245C is even narrower relative to the pickup. Within section 245A, system 135 will travel at a relatively slow ground speed given the width of section 245A. Within section 245B, system 135 will travel at a slightly faster ground speed (compared to the ground speed in section 245A), given that section 245B is narrower than section 245A. Within section 245C, system 135 will travel at an even faster ground speed (compared to the ground speed in section 245B), given that section 245C is even narrower than section 245B. Thus, based on what is shown and described in FIG. 2, control system 129 has learned from episodes 1 and 2 and thus produced more efficiently a balanced bale 110.

Figure 3:
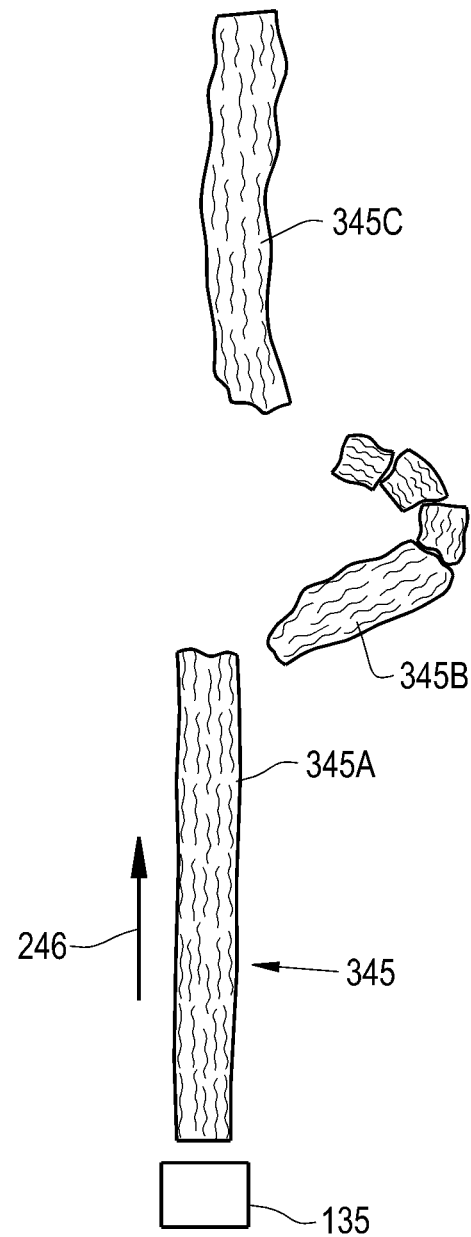
FIG. 3 illustrates a top view of the agricultural baler system baling a windrow of crop material in a field, in accordance with an exemplary embodiment of the present invention.

The third example concerns a broken windrow, such as when crop material 136 of a windrow has been blown over out of the windrow by wind. FIG. 3, which is referred to now, helps to illustrate the third example. FIG. 3 shows schematically a top view of agricultural baler system 135 harvesting a windrow 345 in a field. Windrow 345 includes sections 345A, 345B, and 345C, sections 345A and 345C being on the normal, generally straight line of windrow 345. However, section 345B is a broken section 345B, which, for example, has been blown over out of the generally straight line of windrow 345. In episode 1 (a prior episode), sensors 137 see a windrow 345 ahead and that windrow 345 is broken, such as being blown over by wind, as suggested in FIG. 3 by section 345B. Control system 129 adjusts the direction of travel 246 of system 135 by adjusting the steering angle of steering mechanism 133, so as to steer tractor 100 from section 345A and into section 345B so that baler 101 can attempt to pick up the portion of crop material 136 that has been blown out of line. As a result, baler 101 succeeds in picking up at least some of the crop material 136 in section 345B. But, unfortunately, when baler 101 returns to the normal windrow line in section 345C, baler 101 misses a portion of section 345C (such as a portion of section 345C nearest to section 345B) and thus fails to pick up some crop material 136. It can be understood that the blown out section 345B is substantially blown out. In episode 2 (a current episode), when control system 129 encounters a similar blow over windrow condition (as at section 345B), control system 129 causes system 135 to continue driving on the normal path in direction 246—moving from section 345A directly to section 345C—and leaves blow out section 345B for a later pass. Thus, control system 129 has learned a better policy from episode 1 by way of the system of rewards and punishments (punishments for taking too much time, or expending too much fuel, for deviating into section 345B, but being rewarded for taking direct path from section 345A to 345C). On the other hand, if the windrow is blown over only slightly, it may be more efficient for tractor 100 to take the deviation on the initial pass.

Figure 4:
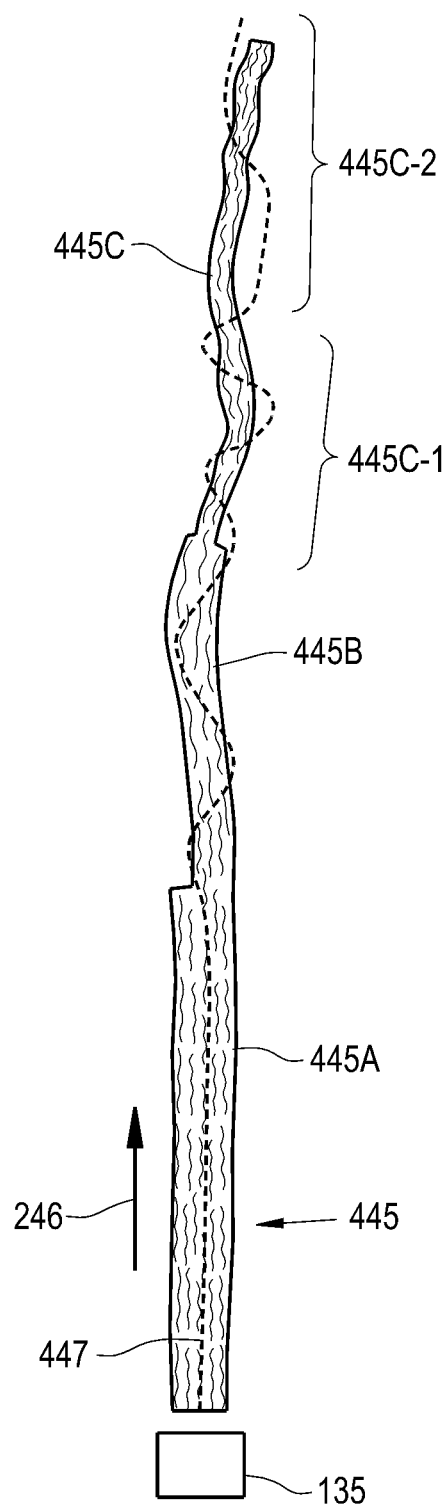
FIG. 4 illustrates a top view of the agricultural baler system baling a windrow of crop material in a field, in accordance with an exemplary embodiment of the present invention.

The fourth example concerns windrow volume. FIG. 4, which is referred to now, helps to illustrate the fourth example. FIG. 4 shows schematically a top view of agricultural baler system 135 harvesting a windrow 445 in a field. Windrow 445 includes sections 445A, 445B, and 445C, each section having a narrower width than the preceding section in the direction of travel 246 of system 135. Further, line shows the path of travel 447 (in the direction of travel 246) taken by a point located on the front of tractor 100 and on the longitudinal centerline of system 135. Path of travel 447 shows system 135 taking a relative straight path in section 445A, a somewhat curvy path (a weave pattern) in section 445B, initially an even more curvy path in section 445C, and then a less curvy path again in section 445C.

In episode 1 (a prior episode) of the fourth example, if windrow 445 is as wide as the pickup of pickup assembly 111, then control system 129 steers tractor 100 such that the longitudinal centerline of tractor 100 is centered with the longitudinal centerline of windrow 445 (as shown by path of travel 447) and maintains that path, with an even bale shape resulting. This is shown in section 445A. When windrow 445 narrows (as in section 445B), control system 129 employs a weave pattern (as shown in section 445B by path of travel 447) in order to allow even filling of bale chamber 109 (left, center and right portions of bale chamber 109) and to avoid making a barrel-shaped bale 110, for example (too much crop in the center of bale 110). The ground speed of tractor 100 may also be adjusted to maintain baler efficiency in the narrower windrow 445 of section 445B. Further, in section 445C, windrow 445 narrows even further relative to section 445B. As a result, control system 129 causes tractor 100 to drive in an even tighter weave pattern, with a higher frequency of turns and/or a higher magnitude with respect to the turns in the weave pattern. This is shown in sub-section 445C-1. This frequency is too high, and/or the magnitude is too high (conversely, it can be appreciated that a scenario can occur where system 135 makes a weave pattern with too low of a frequency and/or too low of a magnitude, resulting in lost crop material 136). In episode 2 (the current episode), control system 129 adapts the weave pattern and can make a ground speed adjustment. For illustrative purposes, this adaptation/adjustment (the result of the learning that has occurred from episode 1) is shown at sub-section 44C-2, which may occur during baling of the same windrow 445 as shown in FIG. 4, but can occur during baling of some subsequent windrow. Thus, instead of making the too-high frequency and/or too-high magnitude turns as in sub-section 44C-1, when sensors 137 see the very narrow windrow 445 as in sub-section 44C-1 control system 129 causes tractor 100 to take a more efficient path compared to what is shown in sub-section 44C-1. Thus, in sub-section 44C-2, tractor 100 makes a smoother weave pattern, with less abrupt turns (lower frequency of turns) and/or lower magnitude turns. Thus, by way of machine learning, control system 129 can modify the weave pattern based on past episodes. Control system 129 (by way of the machine learning algorithm) can learn, for example, what situations require constantly weaving left and right (high frequency of turns), and what situations allow for driving left or right for a longer period of time (lower frequency of turns) and overfilling one side of bale chamber 109 before moving to the other side of bale chamber 109 for a similar period of time.

The fifth example sensor sensitivity readings jumping back and forth to frequently. For instance, bale shape sensor 140 may jump back and forth with overly high frequency and/or with overly high noise (i.e., left and right, or up and down, that is, one extreme side to the other extreme side of a gauge, for example). In episode 1 (a prior episode), system 135 is making consistent windrow feeding into bale chamber 109. However, the reading of bale shape sensor 140 is jumping around rapidly, indicating that the steering of tractor 100 is being controlled in a very reactive manner (which, in fact, it is). The resulting bale 110 may be properly sized and shaped, but control system 129, unfortunately, commanded more movements of tractor 100 than is desired. This is an example of high-frequency steering, which is indicated in sub-section 44C-1 (though the fifth example is not limited to the same situation, namely, a very narrow windrow). In episode 2 (another prior episode, but after episode 1), control system 129, based on learning from episode 1, has reduced the number of steering movements, having filtered out the "noise" of bale shape sensor 140, so as to produce more-controlled steering commands (i.e., lower frequency and/or lower magnitude steering). In episode 3 (the current episode), control system, based on learning from the outcomes of episodes 1 and 2, further adjusts the output commands to steering mechanism 133 (i.e., adjusting steering frequency and/or steering magnitude), so as to further optimize the steering of system 135. This can be depicted in sub-section 445C-2.

Figure 5:
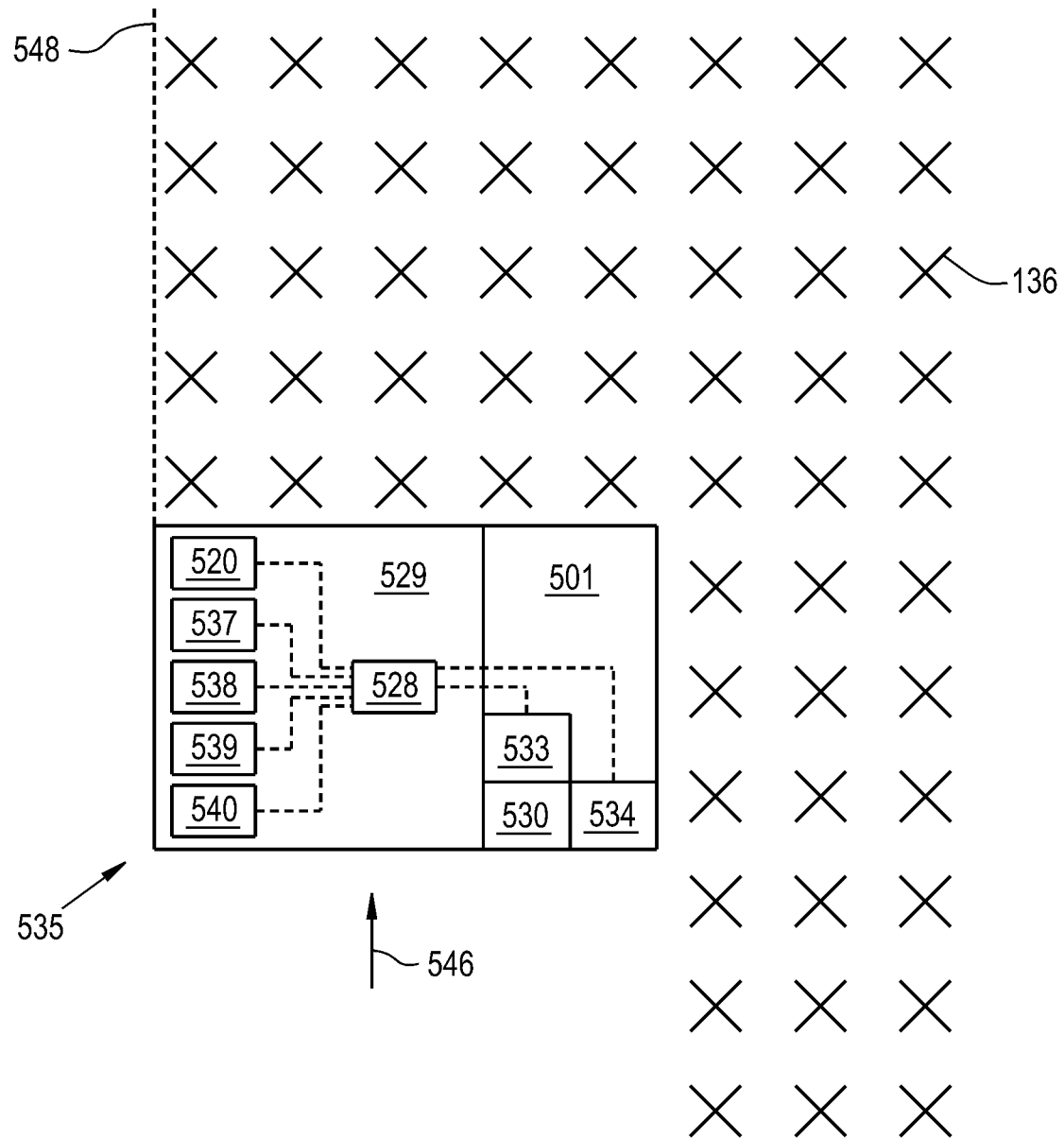
FIG. 5 illustrates a top schematic view of another exemplary embodiment of an agricultural machine system, in accordance with an exemplary embodiment of the present invention.

Referring now to FIG. 5, there is shown a top schematic view of an agricultural machine system 535 performing a harvesting operation, according to an exemplary embodiment of the present invention. System 535 is generic for any agricultural machine system configured for performing any kind of harvesting operation in a field, such systems 535 including but not limited to mowers, cutters, tedders, rakes, mergers, choppers, tillers, balers (such as by way of agricultural machine system 135), loaders of forage wagons, and harvesters (which is also known as a combine). All prior reference numbers with respect to threshing and separating system 130 are increased by a multiple of 100 and are substantially similar to the structures and function of system 135 shown and/or described with respect to FIGS. 1-4, unless otherwise shown and/or described explicitly or implicitly. It can be appreciated that system 535 can be a single self-propelled machine, or can include a work vehicle which pulls, tows, or pushes any suitable kind of implement, depending upon the specific harvesting operation, and can thus have a single control system or a plurality of control systems. FIG. 5 thus show system 535, which can align on any suitable visual line in the field, in this case a line 548 between (a) standing crop material 136 or crop material 136 lying on the ground, and (b) a portion of the field lacking such crop material 136, line 548 being formed by a left edge of crop material 136 in FIG. 1. Line 548 may most clearly illustrate using a mower or harvester for example but is intended to generally represent any useful visual line upon which system 535 can employ for navigation through the field, as baler system 135 used lines of the windrow. System 535 is shown moving in direction 546 in FIG. 1. System 535 includes agricultural machine 501 and control system 529. Machine 501 can be an agricultural vehicle (such as a tractor or a harvester) and an implement coupled with the agricultural vehicle, or can be the implement formed as a self-propelled implement or machine. Machine 501 includes a frame 530, steering mechanism 533, and ground speed mechanism 534, as well as a GPS (not shown), steering mechanism 533, ground speed mechanism 534, and GPS being coupled with frame 530. Control system 529 is operatively coupled with frame 530, steering mechanism 533, and ground speed mechanism 534 (steering mechanism 533 and ground speed mechanism 534 each includes an actuator which can also be deemed to be part of control system 529). Control system 529 includes controller system 528, input/output device 520, visual sensor(s) 537, steering sensor 538, ground speed sensors 539, and generic sensor 540, each of which are coupled with frame 530 and each other. Controller system 528 is operatively coupled with frame 530, steering mechanism 533, and ground speed mechanism 534 and can be a single controller or a plurality of controllers, and controller 528 includes a processor(s), memory, data, and instructions, substantially similar to what is described above with respect to any other controllers. Generic sensor 540 is any suitable sensor associated with the specific function of system 535. Each sensor 537, 538, 539, and 540 is configured for sensing its associated operative parameter and for outputting a signal based thereon to controller system 528, which receives these signals. Controller system 528 is further configured for: learning from a prior harvesting episode; determining an adjustment signal based at least in part on the prior harvesting episode and the signals received from sensors 537, 538, 539, and/or 540; and outputting the adjustment signal so as to adjust steering mechanism 533 and/or ground speed mechanism 534.

In use, agricultural baler system 135 (to refer to a specific example of agricultural machine system 535) bales a field with windrows of crop material 136. However, before doing so, control system 129, including controllers (agents) 115, 123 have been trained with a machine learning algorithm, so that control system 129 picks up the windrows efficiently, producing evenly shaped bales 110. This training can occur on computer simulators but can also include some training within an actual field. This training allows controllers (agents) 115, 123 to conduct exploration before exploiting what they have learned. Eventually, the training phase ends, and controllers (agents) 115, 123 are deployed for service in a field with windrows, as part of control system 129 and baler system 135. During deployment, controllers (agents) 115, 123 exploit what they have learned during prior episodes, but they are also allowed to continue to explore, and thereby produce even more efficient baling, producing evenly shaped bales 110 (in this sense, learning can continue even during deployment and thus after the formal training phase). To do so, controllers 115, 123 are in communication with visual sensors 137 of tractor 100, bale shape sensors 140 of baler 101, and bale size sensor(s) 141 of baler 101, as well as actuators of steering mechanism 133 and ground speed mechanism 134; however, it can be appreciated that the present invention is not limited to these sensor inputs (or any sensors referenced above) but can include, for example, load sensors (such as engine load, PTO load), moisture sensors, and any other suitable sensor helpful to achieve the machine learning for the purposes desired. Further, an operator can make initial settings via device 120, including what the operator would like to constitute as prior episodes.

Figure 6:
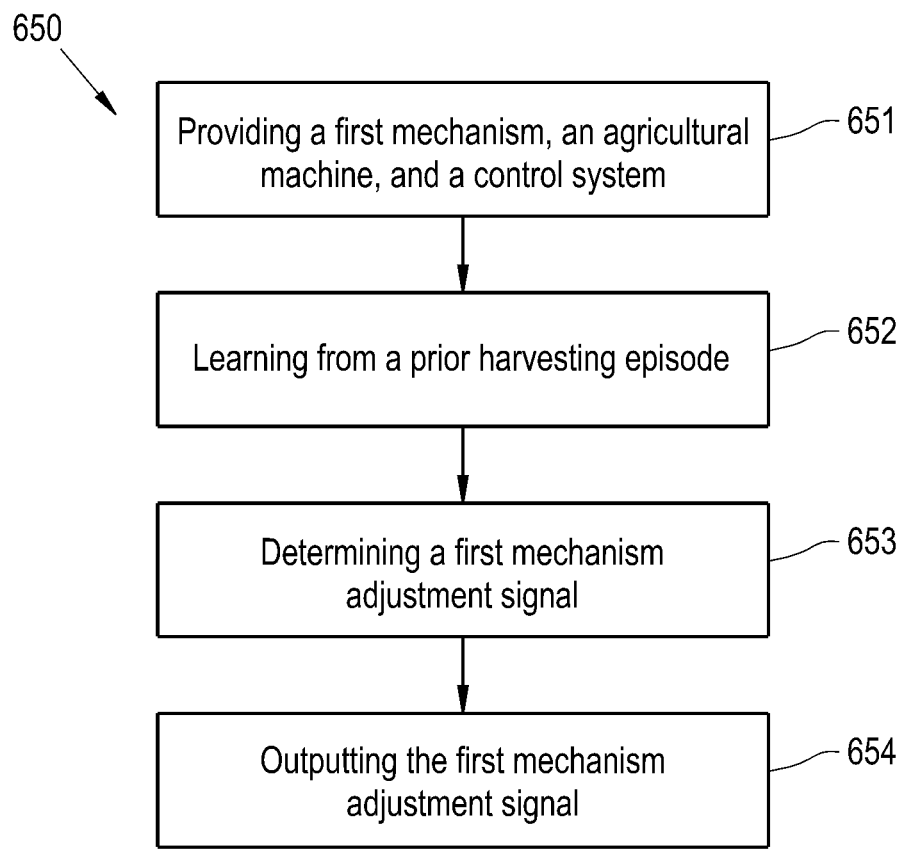
FIG. 6 illustrates a flow diagram showing a method of using an agricultural machine system, in accordance with an exemplary embodiment of the present invention.

Referring now to FIG. 6, there is shown a flow diagram showing method 650 of using an agricultural machine system 135, 535, the method 650 including the steps of: providing 651 a first mechanism 133, 533, an agricultural machine 101, 501, and a control system 129, 529, the agricultural machine 101, 501 including a machine frame 130, 530, the control system 129, 529 operatively coupled with the first mechanism 133, 533 and the agricultural machine 101, 501, the control system 129, 529 including a controller system 128, 528 operatively coupled with the first mechanism 133, 533 and the agricultural machine 101, 501; learning 652, by the controller system 128, 528, from a prior harvesting episode; determining 653, by the controller system 128, 528, a first mechanism adjustment signal based at least in part on the prior harvesting episode; and outputting 654, by the controller system 128, 528, the first mechanism adjustment signal so as to adjust the first mechanism 133, 533. Further, the agricultural machine 101 further includes a chamber 109 coupled with or formed by the machine frame 130, and the controller system 128 is configured for outputting the first mechanism adjustment signal so as to adjust the first mechanism 133 in order to fill the chamber 109 evenly with a crop material 136. The agricultural machine system 135 can further include an agricultural work vehicle 100, wherein the agricultural machine system 135 is an agricultural baler system 135, the agricultural machine 101 being an agricultural baler 101, the machine frame 130 being a baler frame 130, the chamber 109 being a bale chamber 109, the prior harvesting episode being a prior baling episode, the agricultural work vehicle 100 including a work vehicle frame 104 and a steering mechanism 133, the agricultural work vehicle 100 being coupled with the agricultural baler 101 and being operatively coupled with the control system 129 and the controller system 128, the first mechanism 133 being the steering mechanism 133. Further, the agricultural work vehicle 100 can include a second mechanism 134 which is operatively coupled with the control system 129 and the controller system 128. The control system 129 includes: (a) at least one first sensor 137 coupled with the work vehicle frame 104 and configured for: sensing a first operative parameter of a windrow of the crop material 136; outputting a first operative parameter signal corresponding to the first operative parameter; (b) at least one second sensor 140 coupled with the baler frame 130 and configured for: sensing a second operative parameter of the crop material 136 in the bale chamber 109; outputting a second operative parameter signal corresponding to the second operative parameter; and (c) at least one third sensor 141 coupled with the baler frame 109 and configured for: sensing a third operative parameter of the crop material 136 in the bale chamber 109; outputting a third operative parameter signal corresponding to the third operative parameter. The controller system 128 can be operatively coupled with the second mechanism 134, the at least one first sensor 137, the at least one second sensor 140, and the at least one third sensor 141 and can be configured for: receiving the first operative parameter signal, the second operative parameter signal, and the third operative parameter signal; learning from the prior baling episode; determining at least one of a first mechanism adjustment signal and a second mechanism adjustment signal based at least in part on the prior baling episode; and outputting at least one of the first mechanism adjustment signal and the second mechanism adjustment signal so as to adjust respectively at least one of the first mechanism 133 and the second mechanism 134 in order to fill the bale chamber 109 evenly with the crop material 136. Further, the second mechanism 134 can be a ground speed mechanism 134. The at least one first sensor 137 can be a visual sensor 137. The first operative parameter can be a windrow shape, a windrow size, and/or a windrow edge. The at least one second sensor 140 can be a bale shape sensor 140. The second operative parameter can be a bale shape. The at least one third sensor 141 can be a bale size sensor 141. The third operative parameter can be a bale size. Further, the bale chamber 109 includes a left side and a right side. The prior baling episode can include: over-filling the left side or the right side of the bale chamber 109; an overly-high ground speed or an overly-slow ground speed; an inadequate steering when the windrow 345 includes a blown-over section 345B; an overly-high-frequency steering; and/or an overly-high-magnitude steering.

It is to be understood that the steps of method 650 are performed by controller 115, 123, 128, 528 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123, 128, 528 described herein, such as the method 650, is implemented in software code or instructions which are tangibly stored on a tangible computer readable medium. The controller 115, 123, 128, 528 loads the software code or instructions via a direct interface with the computer readable medium or via a wired and/or wireless network. Upon loading and executing such software code or instructions by controller 115, 123, 128, 528, controller 115, 123, 128, 528 may perform any of the functionality of controller 115, 123, 128, 528 described herein, including any steps of the method 650.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural machine system, comprising:
    a first mechanism; and
    an agricultural machine including a machine frame, wherein the agricultural machine system is an agricultural baler system, the agricultural machine being an agricultural baler;

a control system operatively coupled with the first mechanism and the agricultural machine frame, the control system including:
a controller system operatively coupled with the first mechanism and the agricultural machine and configured for:
learning from a prior harvesting episode using bale size with respect to ground speed of the agricultural machine from the prior harvesting episode;
determining a first mechanism adjustment signal based at least in part on the bale size with respect to ground speed of the agricultural machine from the prior harvesting episode; and
outputting the first mechanism adjustment signal so as to adjust the first mechanism.

2. The agricultural machine system of claim 1, wherein the agricultural machine further includes a chamber one of coupled with and formed by the machine frame, and the controller system is configured for outputting the first mechanism adjustment signal so as to adjust the first mechanism in order to fill the chamber evenly with a crop material,
wherein the agricultural machine system further comprises an agricultural work vehicle,
the machine frame being a baler frame, the chamber being a bale chamber, the prior harvesting episode being a prior baling episode, the agricultural work vehicle including a work vehicle frame and a steering mechanism, the agricultural work vehicle being coupled with the agricultural baler and being operatively coupled with the control system and the controller system, the first mechanism being the steering mechanism.

3. The agricultural machine system of claim 2, wherein:
the agricultural work vehicle includes a second mechanism which is operatively coupled with the control system and the controller system;
the control system includes:
at least one first sensor coupled with the work vehicle frame and configured for:
sensing a first operative parameter of a windrow of the crop material;
outputting a first operative parameter signal corresponding to the first operative parameter;
at least one second sensor coupled with the baler frame and configured for:
sensing a second operative parameter of the crop material in the bale chamber;
outputting a second operative parameter signal corresponding to the second operative parameter;
at least one third sensor coupled with the baler frame and configured for:
sensing a third operative parameter of the crop material in the bale chamber;
outputting a third operative parameter signal corresponding to the third operative parameter;
wherein the controller system is operatively coupled with the second mechanism, the at least one first sensor, the at least one second sensor, and the at least one third sensor and is configured for:
receiving the first operative parameter signal, the second operative parameter signal, and the third operative parameter signal;
learning from the prior baling episode;
determining at least one of the first mechanism adjustment signal and a second mechanism adjustment signal based at least in part on the prior baling episode; and outputting at least one of the first mechanism adjustment signal and the second mechanism adjustment signal so as to adjust respectively at least one of the first mechanism and the second mechanism in order to fill the bale chamber evenly with the crop material.

4. The agricultural machine system of claim 3, wherein:
the second mechanism is a ground speed mechanism;
the at least one first sensor is a visual sensor;
the first operative parameter is at least one of a windrow shape, a windrow size, and a windrow edge;
the at least one second sensor is a bale shape sensor;
the second operative parameter is the bale shape;
the at least one third sensor is a bale size sensor; and
the third operative parameter is the bale size.

5. The agricultural machine system of claim 4, wherein the bale chamber includes a left side and a right side, the prior baling episode including at least one of:
over-filling one of the left side and the right side of the bale chamber;
one of an overly-high ground speed and an overly-slow ground speed;
an inadequate steering when the windrow includes a blown-over section;
an overly-high-frequency steering; and
an overly-high-magnitude steering.

6. A control system of an agricultural machine system, the agricultural machine system including a first mechanism and an agricultural machine including a machine frame and a chamber one of coupled with and formed by the machine frame, wherein the agricultural machine system is an agricultural baler system, the agricultural machine being an agricultural baler, the control system operatively coupled with the first mechanism and the agricultural machine frame, the control system comprising:
a controller system configured for being operatively coupled with the first mechanism and the agricultural machine and further configured for:
learning from a prior harvesting episode using bale size with respect to ground speed of the agricultural machine from the prior harvesting episode;
determining a first mechanism adjustment signal based at least in part on the bale size with respect to ground speed of the agricultural machine from the prior harvesting episode; and
outputting the first mechanism adjustment signal so as to adjust the first mechanism in order to fill the chamber evenly with a crop material.

7. The control system of claim 6, wherein the controller system is configured for being a part of the agricultural machine system which is formed as the agricultural baler system which includes an agricultural work vehicle—which includes a work vehicle frame and the first mechanism formed as a steering mechanism—coupled with the agricultural machine formed as the agricultural baler which includes the machine frame formed as a baler frame and a bale chamber one of coupled with and formed by the machine frame, the prior harvesting episode being a prior baling episode, the control system and the controller system each being configured for being coupled with the agricultural work vehicle, the controller system being configured for outputting the first mechanism adjustment signal so as to adjust the first mechanism in order to fill the bale chamber evenly with a crop material.

8. The control system of claim 7, wherein:
the control system is configured for being coupled with the agricultural work vehicle which includes a second mechanism which is operatively coupled with the control system and the controller system;
the control system includes:
at least one first sensor coupled with the work vehicle frame and configured for:
sensing a first operative parameter of a windrow of the crop material;
outputting a first operative parameter signal corresponding to the first operative parameter;
at least one second sensor coupled with the baler frame and configured for:
sensing a second operative parameter of the crop material in the bale chamber;
outputting a second operative parameter signal corresponding to the second operative parameter;
at least one third sensor coupled with the baler frame and configured for:
sensing a third operative parameter of the crop material in the bale chamber;
outputting a third operative parameter signal corresponding to the third operative parameter;
wherein the controller system is configured for being operatively coupled with the second mechanism, the controller system being operatively coupled with the at least one first sensor, the at least one second sensor, and the at least one third sensor and being configured for:
receiving the first operative parameter signal, the second operative parameter signal, and the third operative parameter signal;
learning from the prior baling episode;
determining at least one of the first mechanism adjustment signal and a second mechanism adjustment signal based at least in part on the prior baling episode;
outputting at least one of the first mechanism adjustment signal and the second mechanism adjustment signal so as to adjust respectively at least one of the first mechanism and the second mechanism in order to fill the bale chamber evenly with the crop material.

9. The control system of claim 8, wherein the control system is operatively coupled with the second mechanism formed as the ground speed mechanism, wherein:
the at least one first sensor is a visual sensor;
the first operative parameter is at least one of a windrow shape, a windrow size, and a windrow edge;
the at least one second sensor is a bale shape sensor;
the second operative parameter is the bale shape;
the at least one third sensor is a bale size sensor; and
the third operative parameter is the bale size.

10. The control system of claim 9, wherein the control system is configured for being operatively coupled with the agricultural baler which includes the bale chamber including a left side and a right side, the prior baling episode including at least one of:
over-filling one of the left side and the right side of the bale chamber;
one of an overly-high ground speed and an overly-slow ground speed;
an inadequate steering when the windrow includes a blown-over section;
an overly-high-frequency steering; and
an overly-high-magnitude steering.

11. A method of using an agricultural machine system, the method comprising the steps of:
providing a first mechanism, an agricultural machine, and a control system, wherein the agricultural machine system is an agricultural baler system, the agricultural machine being an agricultural baler, the agricultural machine including a machine frame and a chamber one of coupled with and formed by the machine frame, the control system operatively coupled with the first mechanism and the agricultural machine frame, the control system including a controller system operatively coupled with the first mechanism and the agricultural machine;
learning, by the controller system, from a prior harvesting episode using bale size with respect to ground speed of the agricultural machine from the prior harvesting episode;
determining, by the controller system, a first mechanism adjustment signal based at least in part on the of the bale size with respect to ground speed of the agricultural machine from the prior harvesting episode; and
adjusting, by the controller system, the first mechanism responsive to the first mechanism adjustment signal.

12. The method of claim 11, wherein the agricultural machine further includes a chamber one of coupled with or formed by the machine frame, and the controller system is configured for adjusting the first mechanism responsive to the first mechanism adjustment signal in order to fill the chamber evenly with a crop material,
wherein the agricultural machine system further comprises an agricultural work vehicle,
the machine frame being a baler frame, the chamber being a bale chamber, the prior harvesting episode being a prior baling episode, the agricultural work vehicle including a work vehicle frame and a steering mechanism, the agricultural work vehicle being coupled with the agricultural baler and being operatively coupled with the control system and the controller system, the first mechanism being the steering mechanism.

13. The method of claim 12, wherein:
the agricultural work vehicle includes a second mechanism which is operatively coupled with the control system and the controller system;
the control system includes:
at least one first sensor coupled with the work vehicle frame and configured for:
sensing a first operative parameter of a windrow of the crop material;
outputting a first operative parameter signal corresponding to the first operative parameter;
at least one second sensor coupled with the baler frame and configured for:
sensing a second operative parameter of the crop material in the bale chamber;
outputting a second operative parameter signal corresponding to the second operative parameter;
at least one third sensor coupled with the baler frame and configured for:
sensing a third operative parameter of the crop material in the bale chamber;
outputting a third operative parameter signal corresponding to the third operative parameter;
wherein the controller system is operatively coupled with the second mechanism, the at least one first sensor, the at least one second sensor, and the at least one third sensor and is configured for:
receiving the first operative parameter signal, the second operative parameter signal, and the third operative parameter signal;

learning from the prior baling episode;
determining at least one of the first mechanism adjustment signal and a second mechanism adjustment signal based at least in part on the prior baling episode; and
adjusting at least one of the first mechanism and the second mechanism in order to fill the bale chamber evenly with the crop material responsive respectively to at least one of the first mechanism adjustment signal and the second mechanism adjustment signal.

14. The method of claim 13, wherein:
the second mechanism is a ground speed mechanism;
the at least one first sensor is a visual sensor;
the first operative parameter is at least one of a windrow shape, a windrow size, and a windrow edge;
the at least one second sensor is a bale shape sensor;
the second operative parameter is the bale shape;
the at least one third sensor is a bale size sensor; and
the third operative parameter is the bale size.

15. The method of claim 14, wherein the bale chamber includes a left side and a right side, the prior baling episode including at least one of:
over-filling one of the left side and the right side of the bale chamber;
one of an overly-high ground speed and an overly-slow ground speed;
an inadequate steering when the windrow includes a blown-over section;
an overly-high-frequency steering; and
an overly-high-magnitude steering.

\* \* \* \* \*